United States Patent
Chen et al.

(10) Patent No.: US 9,911,173 B2
(45) Date of Patent: Mar. 6, 2018

(54) METHOD AND DEVICE FOR DISPLAYING IMAGES

(71) Applicant: Xiaomi Inc., Beijing (CN)

(72) Inventors: Zhijun Chen, Beijing (CN); Fei Long, Beijing (CN); Yayong Guan, Beijing (CN)

(73) Assignee: Xiaomi Inc., Beijing (CN)

( * ) Notice: Subject to any disclaimer, the term of this patent is extended or adjusted under 35 U.S.C. 154(b) by 200 days.

(21) Appl. No.: 14/796,029

(22) Filed: Jul. 10, 2015

(65) Prior Publication Data

US 2016/0188999 A1 Jun. 30, 2016

Related U.S. Application Data

(63) Continuation of application No. PCT/CN2015/078113, filed on Apr. 30, 2015.

(30) Foreign Application Priority Data

Dec. 30, 2014 (CN) .......................... 2014 1 0838446

(51) Int. Cl.
- *G06T 1/20* (2006.01)
- *G06K 9/62* (2006.01)
- *G06F 17/30* (2006.01)

(52) U.S. Cl.
CPC ............ *G06T 1/20* (2013.01); *G06F 17/3005* (2013.01); *G06K 9/6215* (2013.01); *G06K 9/6219* (2013.01)

(58) Field of Classification Search
CPC .......................... G06F 3/0484; G06K 9/6215
See application file for complete search history.

(56) References Cited

U.S. PATENT DOCUMENTS

| | | | |
|---|---|---|---|
| 6,240,424 B1 | 5/2001 | Hirata | |
| 7,379,627 B2 | 5/2008 | Li et al. | |

(Continued)

FOREIGN PATENT DOCUMENTS

| | | |
|---|---|---|
| CN | 102737089 | 10/2012 |
| CN | 102782704 | 11/2012 |

(Continued)

OTHER PUBLICATIONS

Chen et al, "Active browsing with similarity pyramids", Nov. 1998, Signals, Systems & AMP, pp. 248-252.*

(Continued)

*Primary Examiner* — Edward Park
(74) *Attorney, Agent, or Firm* — Finnegan, Henderson, Farabow, Garrett & Dunner LLP

(57) ABSTRACT

A method for displaying a plurality of images is provided. The method includes: obtaining one or more image sets based on the plurality of images, wherein a similarity degree between each pair of images in each image set is greater than a similarity threshold; identifying an operation instruction triggered on at least one of the image sets; if the operation instruction triggered on the at least one of the image sets satisfies a predetermined updating condition, updating the similarity threshold; and displaying the plurality of images based on the updated similarity threshold.

9 Claims, 9 Drawing Sheets

(56) References Cited

U.S. PATENT DOCUMENTS

| | | | |
|---|---|---|---|
| 8,874,589 B1 | 10/2014 | Liu et al. | |
| 2004/0024758 A1 | 2/2004 | Iwasaki | |
| 2007/0076960 A1 | 4/2007 | Takamori et al. | |
| 2010/0083178 A1* | 4/2010 | Zui | A61B 1/041 715/823 |
| 2010/0156834 A1* | 6/2010 | Sangster | G06K 9/00677 345/173 |
| 2012/0275666 A1 | 11/2012 | Gao | |

FOREIGN PATENT DOCUMENTS

| | | |
|---|---|---|
| CN | 103488756 | 1/2014 |
| CN | 104111778 A | 10/2014 |
| CN | 104216976 A | 12/2014 |
| CN | 104598534 A | 5/2015 |
| JP | 2012138679 A | 7/2012 |
| RU | 2302656 C2 | 7/2007 |
| WO | WO 2013/191975 A1 | 12/2012 |

OTHER PUBLICATIONS

European Search Report and Opinion from European Patent Office for Application No. 15203170.4, dated May 20, 2016, 9 pages.

Jay-Yeun Chen et al., "Active Browsing with Similarity Pyramids," Signals, Systems & Computers, 1998, Conference Records of the Thirty-Second Asilomar Conference on Pacific Grove, CA, USA, Nov. 1-4, 1998, 5 pages.

Notice of Reason for Refusal from Japanese Patent Office for Japanese Application No. 2016-567115, dated Mar. 24, 2017, and English translation thereof, 7 pages.

Notification of Reason for Refusal from Korean Intellectual Property Office for Korean Application No. 10-2015-702048, dated Aug. 31, 2016, and English translation thereof, 8 pages.

International Search Report for International Application No. PCT/CN2015/078113, dated Oct. 8, 2015, and English translation thereof, 5 pages.

Written Opinion of the International Searching Authority for International Application No. PCT/CN2015/078113, dated Oct. 8, 2015, 8 pages.

* cited by examiner

METHOD AND DEVICE FOR DISPLAYING IMAGES

CROSS-REFERENCE TO RELATED APPLICATIONS

This application is a continuation application of International Application No. PCT/CN2015/078113, filed on Apr. 30, 2015, which is based on and claims priority to Chinese Patent Application No. 201410838446.1, filed Dec. 30, 2014, the entire contents of all of which are incorporated herein by reference.

TECHNICAL FIELD

The present disclosure generally relates to the field of image processing and, more particularly, to methods and devices for displaying images.

BACKGROUND

A terminal may be used to store a large number of images, such as photos taken by a user or pictures downloaded from the Internet. When a user views images via the terminal, often many similar images stored in the terminal are shown on the display, and it is desirable to present the similar images by a same icon for viewing.

A conventional method to display similar images generally includes extracting by the terminal feature vectors of at least two images, calculating a similarity degree between each two images according to the feature vectors, adding the images having a similarity degree greater than a similarity threshold to an image set, and present the similar images based on the image set.

SUMMARY

According to a first aspect of the present disclosure, there is provided a method for displaying a plurality of images, comprising: obtaining one or more image sets based on the plurality of images, wherein a similarity degree between each pair of images in each image set is greater than a similarity threshold; identifying an operation instruction triggered on at least one of the image sets; if the operation instruction triggered on the at least one of the image sets satisfies a predetermined updating condition, updating the similarity threshold; and displaying the plurality of images based on the updated similarity threshold.

According to a second aspect of the present disclosure, there is provided a device for displaying a plurality of images, comprising: a processor; and a memory for storing instructions executable by the processor. The processor is configured to: obtain one or more image sets based on the plurality of images, wherein a similarity degree between each pair of images in each image set is greater than a similarity threshold; identify an operation instruction triggered on at least one of the image sets; if the operation instruction triggered on the at least one of the image sets satisfies a predetermined updating condition, update the similarity threshold; and display the plurality of images based on the updated similarity threshold.

According to a third aspect of the present disclosure, there is provided a non-transitory computer-readable storage medium having stored therein instructions that, when executed by a processor of a terminal device, cause the terminal device to perform a method for displaying a plurality of images, the method comprising: obtaining one or more image sets based on the plurality of images, wherein a similarity degree between each pair of images in each image set is greater than a similarity threshold; identifying an operation instruction triggered on at least one of the image sets; if the operation instruction triggered on the at least one of the image sets satisfies a predetermined updating condition, updating the similarity threshold; and displaying the plurality of images based on the updated similarity threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
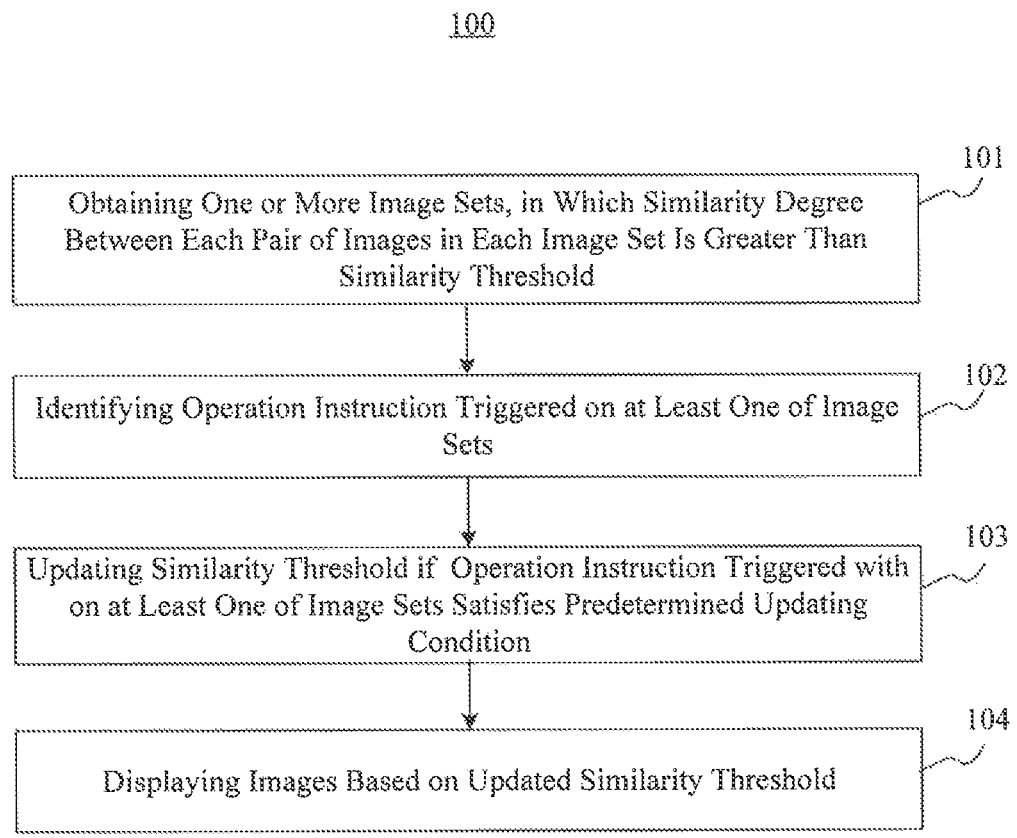
FIG. 1 is a flowchart of a method for displaying images, according to an exemplary embodiment.

FIG. 1 is a flowchart of a method 100 for displaying images, according to an exemplary embodiment. The method 100 may be performed by a terminal device, such as a smart phone, a tablet computer, a laptop, etc. Referring to FIG. 1, the method 100 includes the following steps.

In step 101, the terminal device obtains one or more image sets, in which a similarity degree between each pair of images in each image set is greater than a similarity threshold.

In step 102, the terminal device identifies an operation instruction triggered on at least one of the image sets.

In step 103, if the operation instruction triggered on the at least one of the image sets satisfies a predetermined updating condition, the terminal device updates the similarity threshold.

In step 104, the terminal device displays the images based on the updated similarity threshold.

By updating the similarity threshold if the operation instruction triggered on at least one of the image sets satisfies a predetermined updating condition and displaying the images according to the updated similarity threshold, image sets that include similar images may be generated according to various image similarity requirements of different users.

Figure 2A:
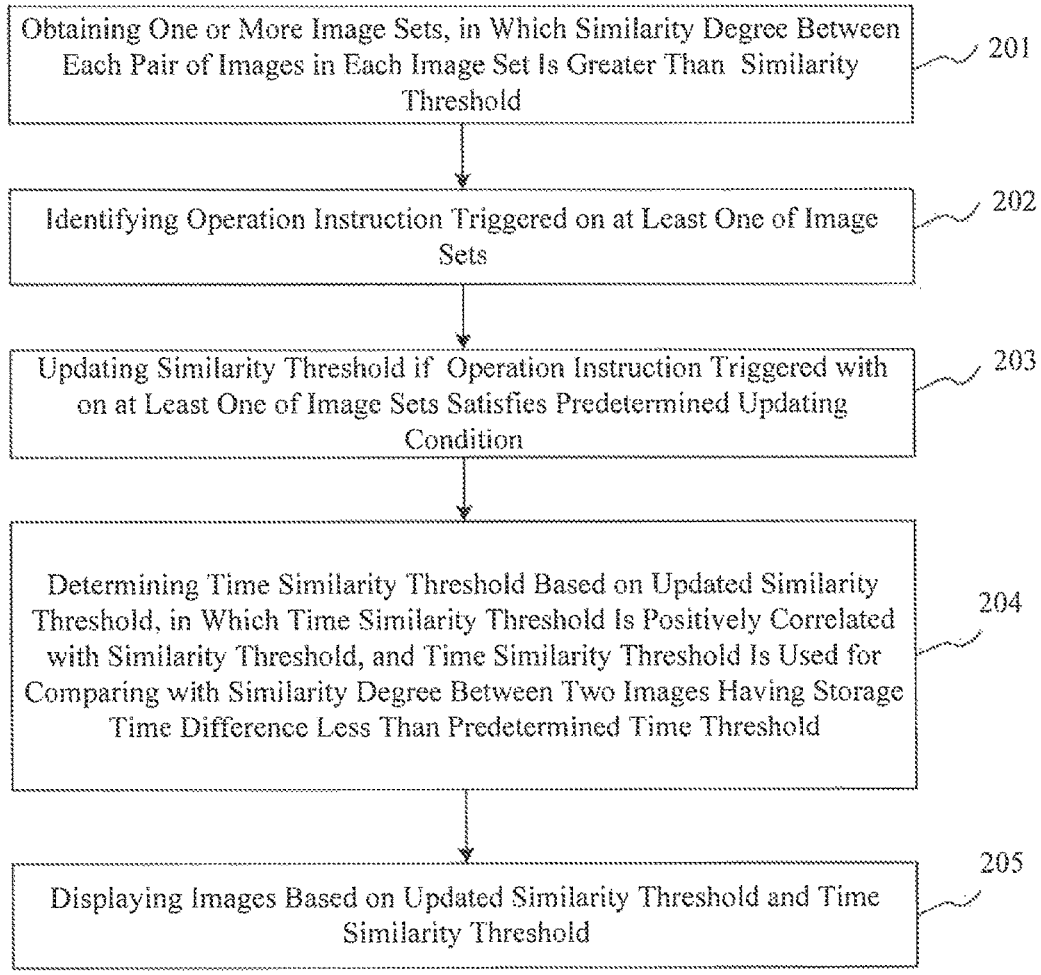
FIG. 2A is a flowchart of a method for displaying images, according to an exemplary embodiment.

FIG. 2A is a flowchart of a method 200a for displaying images, according to an exemplary embodiment. The method 200a may be performed by a terminal device, such as a smart phone, a tablet computer, a laptop, etc. Referring to FIG. 2A, the method 200a includes the following steps.

In step 201, the terminal device obtains one or more image sets, in which a similarity degree between each pair of images in each image set is greater than a similarity threshold.

In some embodiments, the terminal device may identify similar images stored in the terminal device for obtaining the image sets. The images in the terminal may be photos taken by the terminal device or pictures downloaded from the Internet. Step 201 may include following sub-steps.

In the first sub-step, the terminal device extracts feature vectors of at least two images. In the second sub-step, the terminal device calculates a similarity degree between each pair of images according to the feature vectors. In the third sub-step, the terminal device adds images having a similarity degree greater than the similarity threshold to an image set.

Since similar images tend to have similar feature vectors, the terminal device may calculate the similarity degree between each pair of images according to the extracted feature vectors. The feature vector is a vector for representing at least one feature, such as a color feature, a textural feature, and a shape feature, of an image. The terminal device compares the similarity degree between each pair of images with the predetermined similarity threshold of the image set, and adds the corresponding images to the image set if the similarity degree is greater than the similarity threshold.

If there is a same image in two pairs of images having a similarity greater than the similarity threshold, all the three images may be added to a same image set. For example, if the similarity threshold is set to 0.7, the similarity degree between image A and image B is 0.75, and the similarity degree between image A and image C is 0.8, the terminal device may add image A, image B and image C to the same image set.

For example, assuming that there are twelve images, i.e., image A, image B, image C, image D, image E, image F, image G, image H, image I, image J, image K, and image L, the terminal device may determine the similarity degrees between each image and other images as shown in Table 1.

Assuming that the similarity threshold is set to 0.8, it can be determined from Table 1 that, the similarity degree between image A and image B is greater than the similarity threshold 0.8, the similarity degree between image C and image D is greater than the similarity threshold 0.8, the similarity degree between image D and image E is greater than the similarity threshold 0.8, the similarity degree between image G and image F is greater than the similarity threshold 0.8, the similarity degree between image K and image L is greater than the similarity threshold 0.8, and the similarity degree between image L and image J is greater than the similarity threshold 0.8. Thus, the terminal device may include image A and image B, image C and image D as well as image E, image G and image F, image K and image L as well as image J in four separate image sets, respectively. It is assumed that image A and image B are included in an image set 21, image C, image D and image E are included in an image set 22, image G and image F are included in an image set 23, and image K, image L and image J are included in an image set 24, as shown in FIG. 2B.

In step 202, the terminal device identifies an operation instruction triggered on at least one of the image sets.

After obtaining the image sets, the terminal device may identify a type and a count of the operation instruction triggered on at least one of the image sets. The operation instruction may include an opening instruction, an extracting instruction and an adding instruction. The opening instruction is configured for opening an image set. The extracting instruction is configured for extracting an image from an image set. The adding instruction is configured for adding an image to an image set.

Figure 2B:
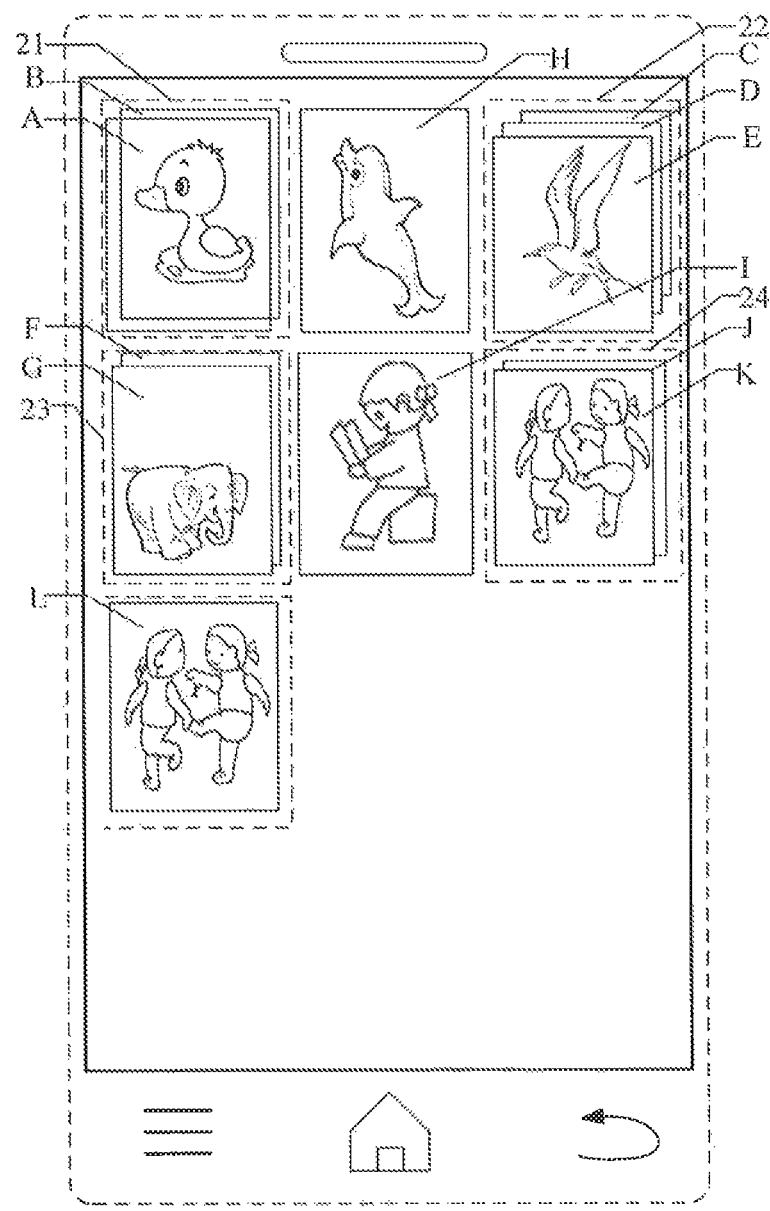
FIG. 2B is a schematic diagram showing extracting an image from an image set, according to an exemplary embodiment.

FIG. 2B is a schematic diagram 200b showing extracting an image from an image set, according to an exemplary embodiment. As shown in FIG. 2B, image L is extracted from the image set 24 for displaying separately.

Figure 2C:
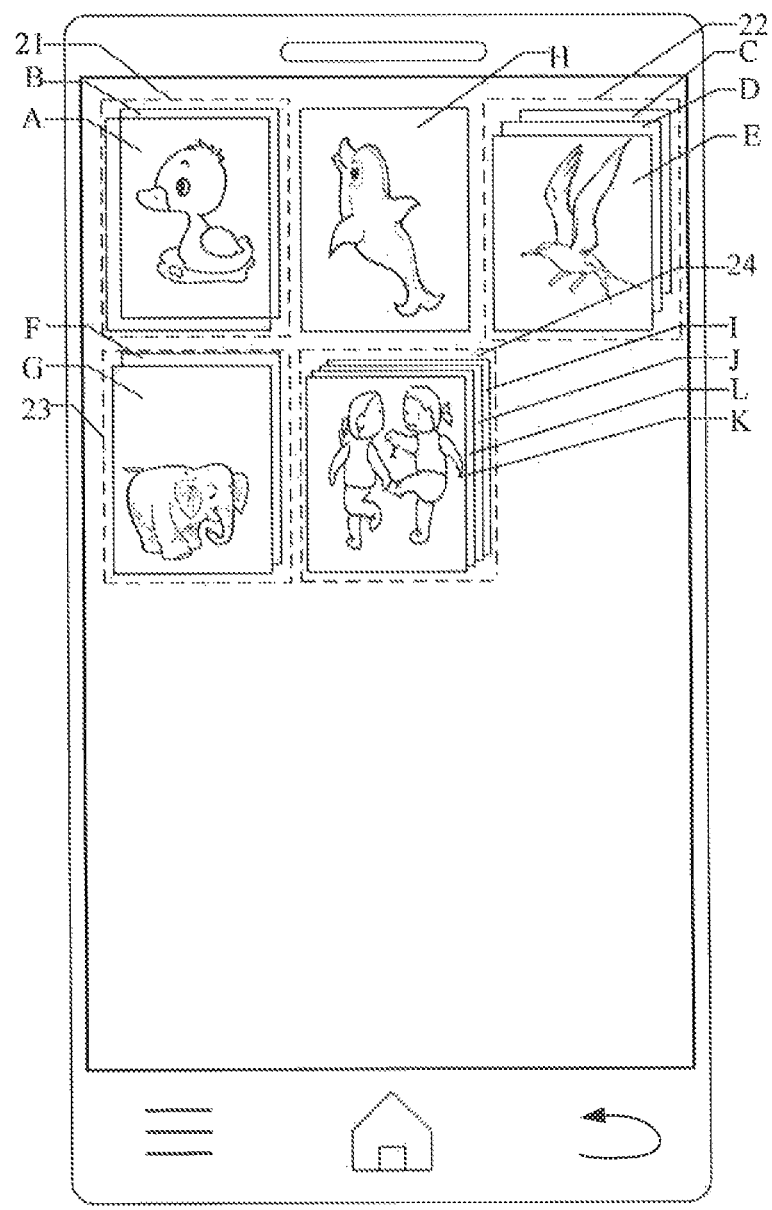
FIG. 2C is a schematic diagram showing adding an image to an image set, according to an exemplary embodiment.

FIG. 2C is a schematic diagram 200c showing adding an image to an image set, according to an exemplary embodiment. As shown in FIG. 2C, image I is added to the image set 24.

In step 203, if the operation instruction triggered on the at least one of the image sets satisfies a predetermined updating condition, the terminal device updates the similarity threshold.

In some embodiments, if the terminal device detects that the operation instruction triggered on one of the image sets satisfies the predetermined updating condition, the terminal device may update the similarity threshold of all the image sets. The predetermined updating condition may be associated with the type of the operation instruction. For example, the operation instruction may be an instruction configured

TABLE 1

| | \multicolumn{11}{c|}{Similarity degrees between images} |
| | A | B | C | D | E | F | G | H | I | J | K |
| --- | --- | --- | --- | --- | --- | --- | --- | --- | --- | --- | --- |
| B | 0.98 | | | | | | | | | | |
| C | 0.06 | 0.07 | | | | | | | | | |
| D | 0.05 | 0.07 | 0.99 | | | | | | | | |
| E | 0.08 | 0.05 | 0.96 | 0.97 | | | | | | | |
| F | 0.03 | 0.11 | 0.12 | 0.02 | 0.02 | | | | | | |
| G | 0.01 | 0.02 | 0.23 | 0.27 | 0.26 | 0.87 | | | | | |
| H | 0.25 | 0.29 | 0.05 | 0.07 | 0.02 | 0.01 | 0.04 | | | | |
| I | 0 | 0 | 0.25 | 0.26 | 0.28 | 0.31 | 0.37 | 0.10 | | | |
| J | 0.12 | 0.13 | 0.26 | 0.35 | 0.37 | 0.32 | 0.35 | 0.02 | 0.21 | | |
| K | 0.11 | 0.03 | 0.20 | 0.27 | 0.29 | 0.37 | 0.41 | 0.28 | 0.25 | 0.96 | |
| L | 0.13 | 0.15 | 0.21 | 0.26 | 0.23 | 0.35 | 0.42 | 0.30 | 0.27 | 0.97 | 0.99 | for instructing the terminal device to extract an image from an image set, or an instruction for instructing the terminal device to add an image to an image set. Step 203 may include following sub-steps.

In the first sub-step, the terminal device may detect whether the operation instruction is configured for extracting an image from an image set or configured for adding an image to an image set.

In some implementations, if operation instructions include an opening instruction, an extracting instruction, and an adding instruction, a count of the opening instruction being triggered may be multiplied by a first weight to obtain a first value, a count of the extracting instruction being triggered may be multiplied by a second weight to obtain a second value, a count of the adding instruction being triggered may be multiplied by a third weight to obtain a third value, and the third value may be subtracted from a sum of the first value and the second value to obtain a difference value.

For example, if the count of the opening instruction being triggered is 100, the first weight is 0.2, the count of the extracting instruction being triggered is 200, the second weight is 0.4, the count of the adding instruction being triggered is 300, and the third weight is 0.4, then the terminal device calculates that the first value is 20, the second value is 80, the third value is 120, and the difference value is −20.

If the difference value is positive and greater than a predetermined first threshold, it may be determined that the operation instruction is configured for extracting an image from an image set. If the difference value calculated by the terminal device is positive and greater than the predetermined first threshold, the operation performed by the user on the image set tends to extract an image from the image set, and the terminal device determines that the operation instruction triggered by the user is configured for extracting an image from one of the image sets and the predetermined updating condition is satisfied. In some implementations, the first threshold is set to be a positive number.

For example, if the difference value obtained by the terminal device is 30 and the first threshold is set to 20, then the difference value is greater than the first threshold, and the terminal device determines that the operation instruction is configured for extracting an image from one of the image sets.

On the other hand, if the difference value is negative and less than a predetermined second threshold, it may be determined that the operation instruction is configured for adding an image to one of the image sets. If the difference value obtained by the terminal device is negative and less than the predetermined second threshold, the operation performed by the user on the image set tends to add an image to the image set, and the terminal device determines that the operation instruction is configured for adding an image to the image set and the predetermined updating condition is satisfied. In some implementations, the second threshold is set to a negative number.

For example, if the difference value is −30 and the second threshold is −20, then the difference value is less than the second threshold, and the terminal device determines that the operation instruction is configured for adding an image to one of the image sets.

In the second sub-step of step 203, if the operation instruction is determined to be configured for extracting an image from one of the image sets, the terminal device may increase the similarity threshold.

In some implementations, when the terminal device detects that the operation instruction triggered by the user is configured for extracting an image from one of the image sets, the terminal device may increase the similarity threshold of all the image sets. For example, the terminal device may add a value to the similarity threshold or may increase the similarity threshold by a proportion.

For example, if the similarity threshold of the image sets is set to 0.8 and the terminal device detects that the operation instruction triggered by the user is configured for extracting an image from one of the folding image sets, the terminal device may add a value of 0.01 to the similarity threshold and update the similarity threshold to be 0.81. Alternatively, the terminal device may increase the similarity threshold by a percentage of 5% and update the similarity threshold to be 0.84.

In the third sub-step of step 203, if the operation instruction is determined to be configured for adding an image to one of the image sets, the terminal device may decrease the similarity threshold.

In some implementations, when the terminal device detects that the operation instruction triggered by the user is configured for adding an image to an image set, the similarity threshold of all the image sets may be decreased. For example, the terminal device may subtract a value from the similarity threshold or may decrease the similarity threshold by a proportion.

For example, if the similarity threshold of the image set is set as 0.8 and the terminal detects that the operation instruction triggered by the user is configured for adding an image to the image set, the terminal device may subtract 0.01 from the similarity threshold and update the similarity threshold to be 0.79. Alternatively, the terminal device may decrease the similarity threshold by a percentage of 5% and update the similarity threshold to be 0.76.

In step 204, the terminal device determines a time similarity threshold based on the updated similarity threshold. The time similarity threshold may be positively correlated with the similarity threshold, and the time similarity threshold may be used for comparing with the similarity degree between two images having a storage time difference less than a predetermined time threshold.

For example, the closer the time when the user takes photos or downloads images, the higher the similarity degree between the photos or pictures may be. When the user takes photos using the continuous shooting mode, the obtained photos may have a small difference. Thus, the terminal device may set the time similarity threshold according to the storage time of the images, where the time similarity threshold may be set to be a lower value than the similarity threshold.

In some implementations, the time similarity threshold may be set to be positively correlated with the similarity threshold. For example, the time similarity threshold may increase with the increasing of the similarity threshold, and may decrease with the decreasing of the similarity threshold.

In some implementations, the time similarity threshold may be set by multiplying the similarity threshold with a proportion, or subtracting a value from the similarity threshold.

For example, if the similarity threshold of the image set is set to 0.8, the time similarity threshold may be set to the similarity threshold multiplied by 50%, which is 0.4. Alternatively, the time similarity threshold may be set to the similarity threshold minus 0.1, which is 0.7.

In some implementations, after updating the similarity threshold of the image sets, the terminal device may also update the time similarity threshold according to the updated similarity threshold.

For example, if the similarity threshold of the image sets is updated to be 0.7, then the terminal may multiply the similarity threshold by 50% to obtain the time similarity threshold of 0.35. Alternatively, the terminal device may subtract 0.2 from the similarity threshold to obtain the time similarity threshold of 0.5.

In some implementations, the time similarity threshold may be set to a predetermined value, which may increase or decrease with the increasing or decreasing of the similarity threshold. In the present disclosure, the method of obtaining the time similarity threshold is not intended to be limited.

In step 205, the terminal device displays the images according to the updated similarity threshold and the time similarity threshold.

For example, the terminal device may display newly added images according to the updated similarity threshold and time similarity threshold. As another example, the terminal device may extract images from the original image sets, generate one or more new image sets, and include the extracted images in the new image sets according to the updated similarity threshold and the time similarity threshold.

In some embodiments, the step 205 may include the following sub-steps. In the first sub-step, the terminal device may calculate a similarity degree and a storage time difference between each pair of images that belong to the image sets. For example, the calculation of the similarity degree between a pair of images may be performed using the method described in step 201. The storage time difference is an absolute value of a difference of the storage time of the two images. For example, if the storage time of image A is 01:21:00 on Nov. 11, 2014, and the storage time of image B is 01:20:00 on Nov. 11, 2014, then the storage time difference between image A and image B is one minute.

In the second sub-step, if the storage time difference of a pair of images is less than the predetermined time threshold, the terminal device may display the pair of images based on the calculated similarity degree and the time similarity threshold. For example, the terminal device may detect whether the storage time difference between a pair of images is less than the predetermined time threshold. If the storage time difference between the pair of images is less than the predetermined time threshold, the terminal device may compare the similarity degree between the pair of images with the time similarity threshold, and if the similarity degree is less than the time similarity threshold, the terminal device may add the corresponding pair of images to the same image set.

In the third sub-step, if the storage time difference of a pair of images is greater than or equal to the predetermined time threshold, the terminal device may display the pair of images based on the calculated similarity degree and the similarity threshold. For example, if the terminal device detects that the storage time difference between a pair of images is greater than or equal to the predetermined time threshold, the terminal device may compare the similarity degree between the pair of images with the similarity threshold, and if the similarity degree is greater than the similarity threshold, the terminal device may add the corresponding pair of images to the same image set.

Figure 2D:
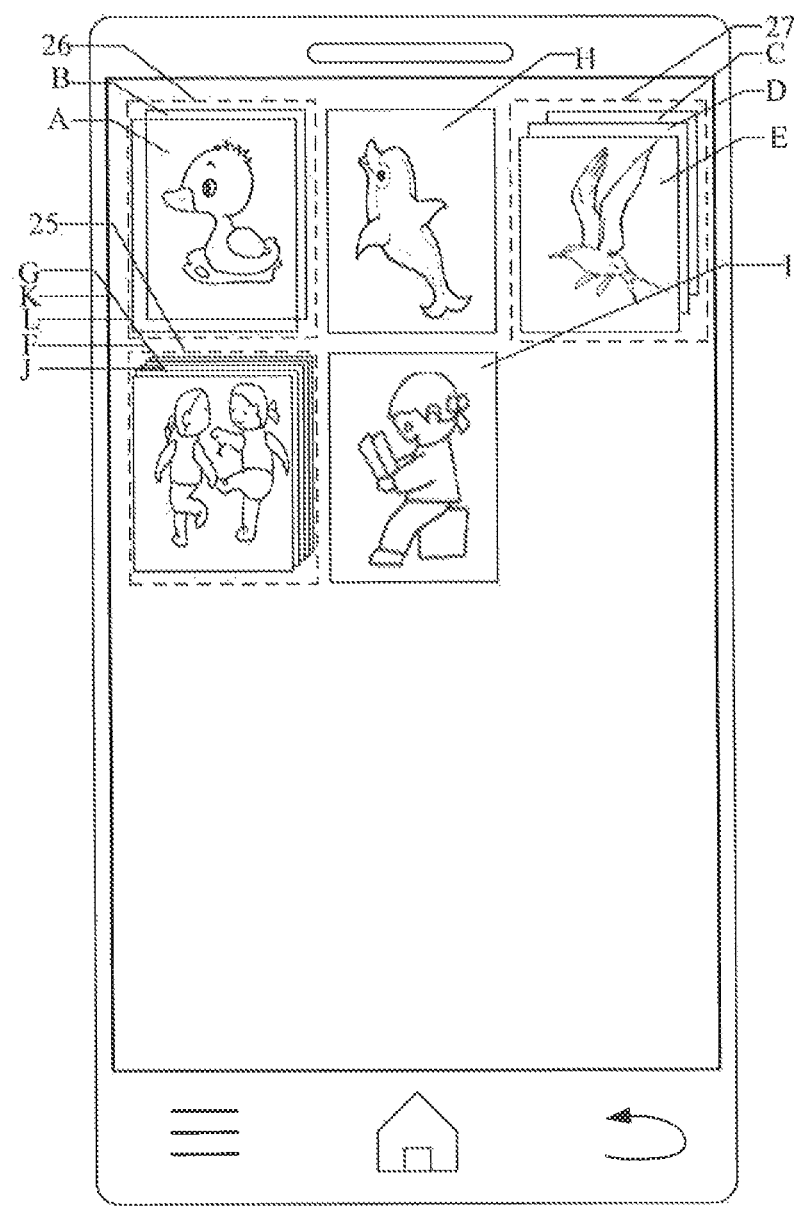
FIG. 2D is a schematic diagram showing a display of images, according to an exemplary embodiment.

FIG. 2D is a schematic diagram 200d showing a display of images, according to an exemplary embodiment. In FIG. 2D, the similarity degrees between the images calculated by the terminal device are shown in Table 1, and the storage time differences between the images are shown in Table 2 in the unit of minutes.

TABLE 2

| Storage time differences between images | | | | | | | | | | |
|---|---|---|---|---|---|---|---|---|---|---|
| | A | B | C | D | E | F | G | H | I | J | K |
| B | 3 | | | | | | | | | | |
| C | 20 | 5 | | | | | | | | | |
| D | 3 | 35 | 99 | | | | | | | | |
| E | 5 | 65 | 96 | 7 | | | | | | | |
| F | 11 | 75 | 12 | 20 | 2 | | | | | | |
| G | 24 | 2 | 23 | 7 | 6 | 87 | | | | | |
| H | 12 | 29 | 5 | 7 | 2 | 10 | 4 | | | | |
| I | 10 | 8 | 25 | 26 | 8 | 31 | 37 | 10 | | | |
| J | 25 | 13 | 26 | 35 | 7 | 32 | 45 | 20 | 21 | | |
| K | 55 | 3 | 20 | 27 | 29 | 37 | 1 | 28 | 25 | 96 | |
| L | 33 | 15 | 21 | 0.26 | 23 | 35 | 1 | 30 | 27 | 97 | 99 |

Assuming that the predetermined time threshold is three minutes, the time similarity threshold is set to 0.4, and the similarity threshold is set to 0.7, it can be determined from Table 2 that, the storage time difference between image E and image F is less than three minutes, the storage time difference between image B and image G is less than three minutes, the storage time difference between image E and image H is less than three minutes, the storage time difference between image G and image K is less than three minutes, and the storage time difference between image G and image L is less than three minutes. Then, the terminal device may determine whether the similarity degree between image E and image F is greater than the time similarity threshold, whether the similarity degree between image B and image G is greater than the time similarity threshold, whether the similarity degree between image E and image H is greater than the time similarity threshold, whether the similarity degree between image G and image K is greater than the time similarity threshold, and whether the similarity degree between image G and image L is greater than the time similarity threshold. Since the similarity degree between image G and image K is greater than the time similarity threshold 0.4 and the similarity degree between image G and image L is greater than the time similarity threshold 0.4, the terminal device may add image G, image K and image L to the image set 25.

The terminal device may also determine whether the similarity degree between two images having a storage time difference greater than or equal to three minutes is greater than the similarity threshold, which is set to 0.7 in this example. Since the similarity degree between image A and image B is greater than the similarity threshold 0.7, both the similarity degree between image C and image D and the similarity degree between image D and image E are greater than the similarity threshold 0.7, the similarity degree between image G and image F is greater than the similarity threshold 0.7, and both the similarity degree between image K and image L and the similarity degree between image L and image J are greater than the similarity threshold 0.7, the terminal device may add image A and image B to the image set 26, and add image C, image D and image E to the image set 27. Moreover, since image G, image K and image L are present in the image set 25, the terminal device may add image F and image J to the image set 25.

In some implementations, the terminal device may also rank the images in an order of storage time from remote to recent or reversely, and then display the images according to the storage time differences and similarity degrees between the images.

For example, the terminal device may detect sequentially whether the storage time difference between a reference image and a prior image is greater than the predetermined time threshold and whether the storage time difference between the reference image and a later image is greater than the predetermined time threshold. If the terminal device detects that the storage time difference between the reference image and a certain prior image is greater than or equal to the predetermined time threshold, then the storage time difference between the image and any image preceding the certain prior image is greater than the predetermined time threshold. If the terminal device detects that the storage time difference between the reference image and a certain later image is greater than or equal to the predetermined time threshold, then the storage time difference between the reference image and any image succeeding the certain later image is greater than the predetermined time threshold.

For example, the terminal device ranks the images in an order of storage time from recent to remote as follows:

Image A: 11:50:00, Jan. 1, 2014
Image B: 11:05:00, Jan. 1, 2014
Image F: 11:03:00, Jan. 1, 2014
Image E: 11:00:00, Jan. 1, 2014
Image D: 10:10:00, Jan. 1, 2014
Image C: 10:00:00, Jan. 1, 2014

Figure 2E:
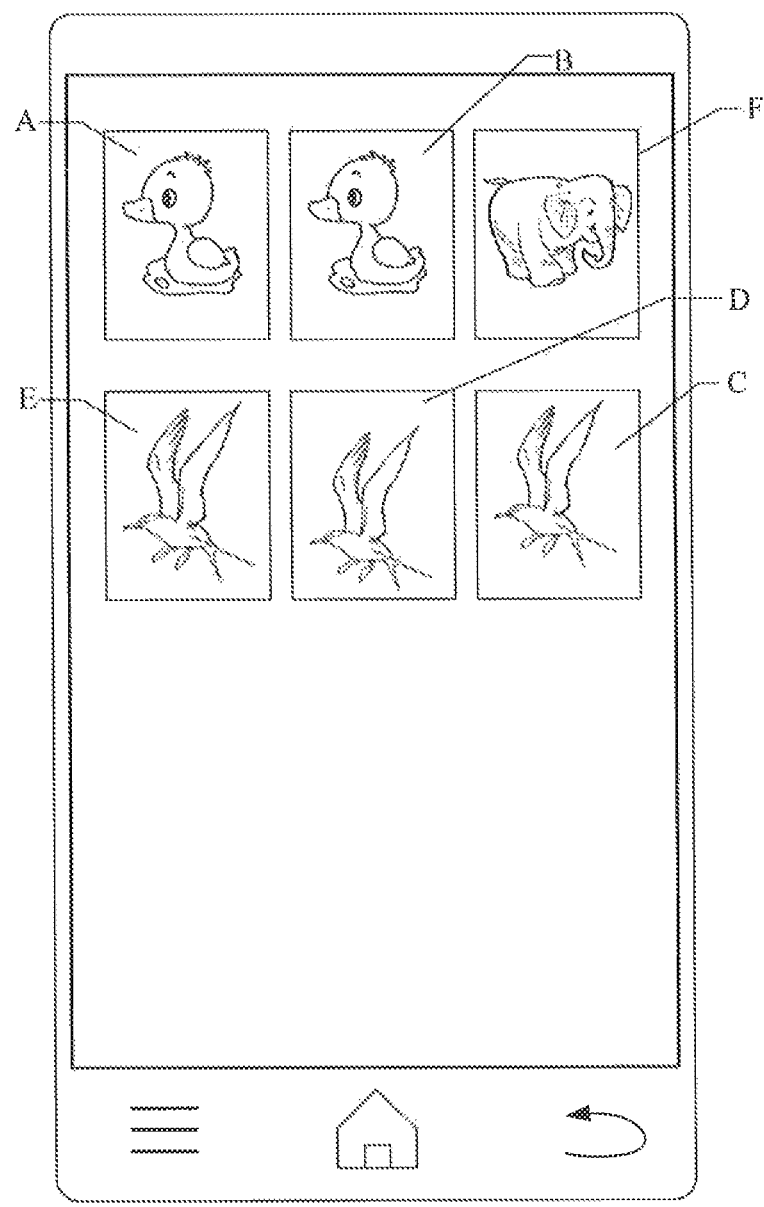
FIG. 2E is a schematic diagram showing a sequence of images, according to an exemplary embodiment.

FIG. 2E is a schematic diagram 200e showing a sequence of images, according to an exemplary embodiment. The above storage time is used in FIG. 2E. Assuming that image E is taken as the reference image, the terminal device detects sequentially the storage time differences between image E and images preceding and succeeding image E, where the predetermined time threshold is set to four minutes. The terminal device detects that the storage time difference between image E and image F is three minutes which is less than the predetermined time threshold (four minutes). Then the terminal device detects the storage time difference between image E and image B. Since the storage time difference between image E and image B is five minutes which is greater than the predetermined time threshold (four minutes), the terminal device determines that the storage time difference between image E and image A is greater than the predetermined time threshold. Then, the terminal device detects the storage time difference between image E and image D, and since the storage time difference between image E and image D is ten minutes which is greater than the predetermined time threshold (four minutes), the terminal device determines that the storage time difference between image E and image C is also greater than the predetermined time threshold. Thus, image E and image F are arranged for display according to the corresponding similarity degree and the time similarity threshold, while image E, image A, image B, image D and image C are arranged for display according to the corresponding similarity degrees and the similarity threshold.

By ranking the images according to the storage time and detecting a first image having a storage time difference greater than the predetermined time threshold with the reference image, if the storage time of the detected image is prior to that of the reference image, the terminal device may omit the comparison operation between the reference image and the images preceding the detected image. If the storage time of the detected image is later than that of the reference image, then the storage time difference between the reference image and any image succeeding the detected image is greater than the predetermined time threshold, and thus the terminal device may omit the comparison operation between the reference image and the images succeeding the detected image. In doing so, the processing load of comparing storage time differences between images is reduced, and the efficiency of arranging images for display is enhanced.

In some implementations, after completing the image set determination, the terminal device may use an image quality evaluation algorithm to select an image with a good quality from each image set as a presentation image of the image set.

Figure 3:
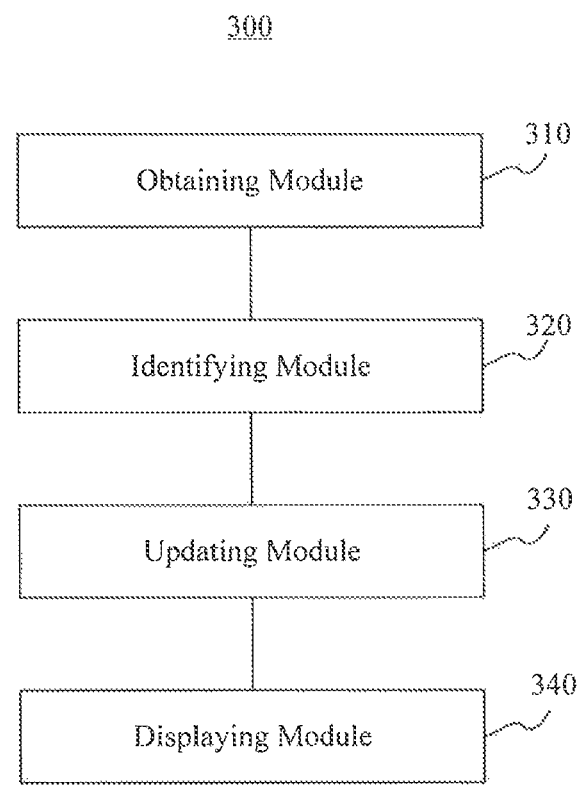
FIG. 3 is a block diagram of a device for displaying images, according to an exemplary embodiment.

FIG. 3 is a block diagram of a device 300 for displaying images, according to an exemplary embodiment. The device 300 may be implemented as a part or all of in a terminal device. Referring to FIG. 3, the device 300 includes an obtaining module 310, an identifying module 320, an updating module 330, and a displaying module 340.

The obtaining module 310 is configured to obtain one or more image sets from a plurality of images, in which a similarity degree between each pair of images in each image set is greater than a similarity threshold.

The identifying module 320 is configured to identify an operation instruction triggered on at least one of the image sets obtained by the obtaining module 310.

The updating module 330 is configured to update the similarity threshold if the operation instruction triggered on the at least one of the image sets satisfies a predetermined updating condition.

The displaying module 340 is configured to display the images based on the updated similarity threshold obtained by the updating module 330.

Figure 4:
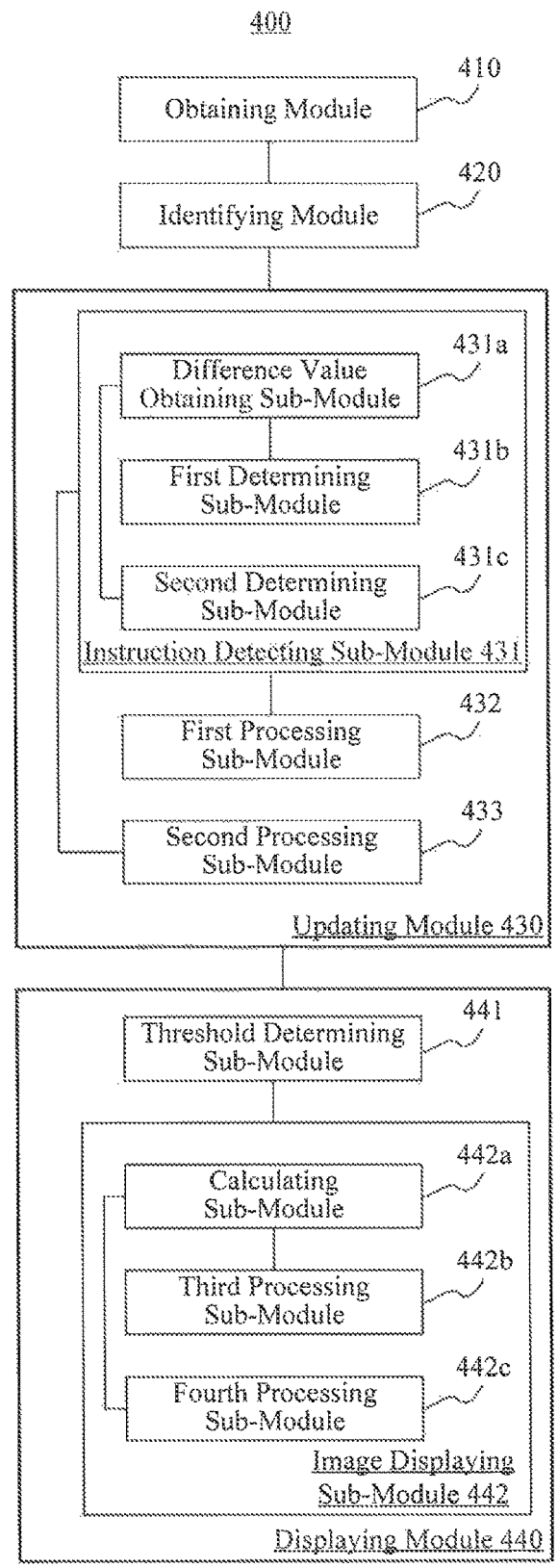
FIG. 4 is a block diagram of a device for displaying images, according to an exemplary embodiment.

FIG. 4 is a block diagram of a device 400 for displaying images, according to an exemplary embodiment. The device 400 may be implemented as a part or all of in a terminal device. Referring to FIG. 4, the device 400 includes an obtaining module 410, an identifying module 420, an updating module 430, and a displaying module 440.

The obtaining module 410 is configured to obtain one or more image sets from a plurality of images, in which a similarity degree between each pair of images in each image set is greater than a similarity threshold.

The identifying module 420 is configured to identify an operation instruction triggered on at least one of the image sets obtained by the obtaining module 410.

The updating module 430 is configured to update the similarity threshold if the operation instruction triggered on the at least one of the image sets satisfies a predetermined updating condition.

The displaying module 440 is configured to display the images according to the updated similarity threshold obtained by the updating module 430.

In some embodiments, the updating module 430 includes an instruction detecting sub-module 431, a first processing sub-module 432, and a second processing sub-module 433.

The instruction detecting sub-module 431 is configured to detect whether the operation instruction is configured for extracting an image from one of the image sets, or configured for adding an image to one of the image sets.

The first processing sub-module 432 is configured to increase the similarity threshold if the instruction detecting sub-module 431 detects that the operation instruction is configured for extracting an image from one of the image sets.

The second processing sub-module 433 is configured to decrease the similarity threshold if the instruction detecting sub-module 431 detects that the operation instruction is configured for adding an image to one of the image sets.

In some embodiments, the operation instruction includes an opening instruction, an extracting instruction and an adding instruction, and the instruction detecting sub-module 431 includes a difference value obtaining sub-module 431a, a first determining sub-module 431b, and a second determining sub-module 432c.

The difference value obtaining sub-module 431a is configured to multiply a count of the opening instruction being triggered by a first weight to obtain a first value, to multiply a count of the extracting instruction being triggered by a second weight to obtain a second value, to multiply a count of the adding instruction being triggered by a third weight to obtain a third value, and to subtract the third value from a sum of the first value and the second value to obtain a difference value.

The first determining sub-module 431b is configured to determine that the operation instruction is configured for extracting an image from one of the image sets if the difference value obtained by the difference value obtaining sub-module 431a is positive and greater than a first threshold.

The second determining sub-module 431c is configured to determine that the operation instruction is configured for adding an image to one of the image sets if the difference value obtained by the difference value obtaining sub-module 431a is negative and less than a second threshold.

In some embodiments, the displaying module 440 includes a threshold determining sub-module 441 and an image displaying sub-module 442.

The threshold determining sub-module 441 is configured to determine a time similarity threshold based on the updated similarity threshold. In some embodiments, the time similarity threshold is positively correlated with the similarity threshold, and the time similarity threshold is used for comparing with the similarity degree between two images having a storage time difference less than a predetermined time threshold.

The image displaying sub-module 442 is configured to display the images based on the updated similarity threshold and the time similarity threshold determined by the threshold determining sub-module 441.

In some embodiments, the image displaying sub-module 442 includes a calculating sub-module 442a, a third processing sub-module 442b, and a fourth processing sub-module 442c.

The calculating sub-module 442a is configured to calculate a similarity degree and a storage time difference between a pair of images.

The third processing sub-module 442b is configured to display the pair of images based on the calculated similarity and the time similarity threshold if the storage time difference of a pair of images obtained by the calculating sub-module 442a is less than the predetermined time threshold.

The fourth processing sub-module 442c is configured to display the pair of images based on the calculated similarity and the similarity threshold if the storage time difference of the pair of images obtained by the calculating sub-module 442a is greater than or equal to the predetermined time threshold.

Figure 5:
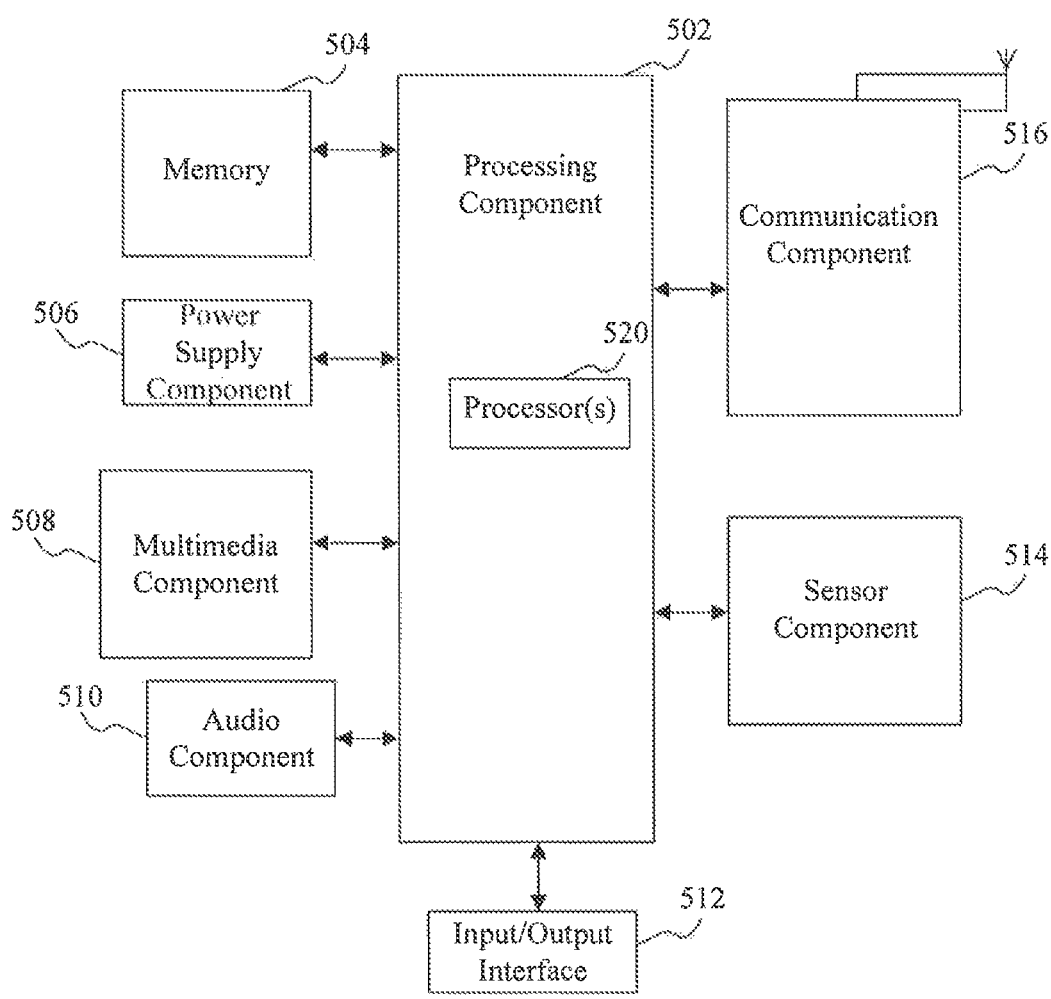
FIG. 5 is a block diagram of a terminal device for displaying images, according to an exemplary embodiment.

FIG. 5 is a block diagram of a terminal device 500 for displaying images, according to an exemplary embodiment. For example, the terminal device 500 may be a mobile phone, a computer, a digital broadcast terminal, a message transceiver device, a game console, a tablet device, a medical device, an exercise equipment, a personal digital assistant (PDA), and the like.

Referring to FIG. 5, the terminal device 500 may include one or more of the following components: a processing component 502, a memory 504, a power component 506, a multimedia component 508, an audio component 510, an input/output (I/O) interface 512, a sensor component 514, and a communication component 516. The person skilled in the art should appreciate that the structure of the terminal device 500 as shown in FIG. 5 does not intend to limit the terminal device 500. The terminal device 500 may include more or less components or combine some components or other different components.

The processing component 502 typically controls overall operations of the terminal device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal device 500. Examples of such data include instructions for any applications or methods operated on the terminal device 500, contact data, phonebook data, messages, images, video, etc. The memory 504 is also configured to store programs and modules. The processing component 502 performs various functions and data processing by operating programs and modules stored in the memory 504. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 506 is configured to provide power to various components of the terminal device 500. The power supply component 506 may include a power management system, one or more power sources, and any other components associated with the generation, management, and distribution of power in the terminal device 500.

The multimedia component 508 includes a screen providing an output interface between the terminal device 500 and a user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 508 includes a front camera and/or a rear camera. The front camera and the rear camera may receive external multimedia data while the terminal device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the terminal device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal device 500. For instance, the sensor component 514 may detect an on/off state of the terminal device 500 and relative positioning of components (e.g., the display and the keypad of the terminal device 500). The sensor component 514 may also detect a change in position of the terminal device 500 or of a component in the terminal device 500, a presence or absence of user contact with the terminal device 500, an orientation or an acceleration/deceleration of the terminal device 500, and a change in temperature of the terminal device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the terminal device 500 and other devices. The terminal device 500 can access a wireless network based on a communication standard, such as WiFi, 2G or 3G, or a combination thereof. In one exemplary embodiment, the communication component 516 receives a broadcast signal or broadcast information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor(s) 520 in the terminal device 500, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a plurality of images, comprising:
    obtaining one or more image sets based on the plurality of images, wherein a similarity degree between each pair of images in each image set is greater than a similarity threshold;
    identifying an operation instruction triggered on at least one of the image sets;
    if the operation instruction triggered on the at least one of the image sets satisfies a predetermined updating condition, updating the similarity threshold; and
    displaying the plurality of images based on the updated similarity threshold,
    wherein updating the similarity threshold comprises:
        detecting whether the operation instruction is configured for extracting an image from the at least one of the image sets or configured for adding an image to the at least one of the image sets;
        if the operation instruction is configured for extracting an image from the at least one of the image sets, increasing the similarity threshold; and
        if the operation instruction is configured for adding an image to the at least one of the image sets, decreasing the similarity threshold,
    wherein detecting whether the operation instruction is configured for extracting an image from the at least one of the image sets or configured for adding an image to the at least one of the image sets comprises:
        obtaining a difference value based on an opening instruction, an extracting instruction, and an adding instruction;
        if the difference value is positive and greater than a first threshold, determining that the operation instruction is configured for extracting the image from the at least one of the image sets; and
        if the difference value is negative and less than a second threshold, determining that the operation instruction is configured for adding the image to the at least one of the image sets.

2. The method according to claim 1, wherein obtaining a difference value comprises:
    multiplying a count of the opening instruction being triggered by a first weight to obtain a first value;
    multiplying a count of the extracting instruction being triggered by a second weight to obtain a second value;

multiplying a count of the adding instruction being triggered by a third weight to obtain a third value; and
subtracting the third value from a sum of the first value and the second value to obtain the difference value.

3. The method according to claim 1, wherein displaying the plurality of images according to the updated similarity threshold comprises:
determining a time similarity threshold based on the updated similarity threshold, wherein the time similarity threshold is positively correlated with the updated similarity threshold, and is configured to compare with the similarity degree between two images having a storage time difference less than a predetermined time threshold; and
displaying the plurality of images based on the updated similarity threshold and the time similarity threshold.

4. The method according to claim 3, wherein displaying the plurality of images according to the updated similarity threshold and the time similarity threshold comprises:
calculating a similarity degree and a storage time difference between a pair of images in the plurality of images;
if the storage time difference is less than the predetermined time threshold, displaying the pair of images based on the similarity degree and the time similarity threshold; and
if the storage time difference is greater than or equal to the predetermined time threshold, displaying the pair of images based on the similarity degree and the updated similarity threshold.

5. A device for displaying a plurality of images, comprising:
a processor; and
a memory configured to store instructions executable by the processor;
wherein the processor is configured to:
obtain one or more image sets based on the plurality of images, wherein a similarity degree between each pair of images in each image set is greater than a similarity threshold;
identify an operation instruction triggered on at least one of the image sets;
if the operation instruction triggered on the at least one of the image sets satisfies a predetermined updating condition, update the similarity threshold; and
display the plurality of images based on the updated similarity threshold,
wherein the processor is configured to update the similarity threshold by performing:
detecting whether the operation instruction is configured for extracting an image from the at least one of the image sets or configured for adding an image to the at least one of the image sets;
if the operation instruction is configured for extracting an image from the at least one of the image sets, increasing the similarity threshold; and
if the operation instruction is configured for adding an image to the at least one of the image sets, decreasing the similarity threshold,
wherein the processor is configured to detect whether the operation instruction is configured for extracting an image from the at least one of the image sets or configured for adding an image to the at least one of the image sets by performing:
obtaining a difference value based on an opening instruction, an extracting instruction, and an adding instruction;
if the difference value is positive and greater than a first threshold, determining that the operation instruction is configured for extracting the image from the at least one of the image sets; and
if the difference value is negative and less than a second threshold, determining that the operation instruction is configured for adding the image to the at least one of the image sets.

6. The device according to claim 5, wherein the processor is configured to obtain the difference value by performing:
multiplying a count of the opening instruction being triggered by a first weight to obtain a first value;
multiplying a count of the extracting instruction being triggered by a second weight to obtain a second value;
multiplying a count of the adding instruction being triggered by a third weight to obtain a third value; and
subtracting the third value from a sum of the first value and the second value to obtain the difference value.

7. The device according to claim 5, wherein the processor is configured to display the plurality of images according to the updated similarity threshold by performing:
determining a time similarity threshold according to the updated similarity threshold, wherein the time similarity threshold is positively correlated with the updated similarity threshold, and is configured to compare with the similarity degree between two images having a storage time difference less than a predetermined time threshold; and
displaying the plurality of images based on the updated similarity threshold and the time similarity threshold.

8. The device according to claim 7, wherein displaying the plurality of images according to the updated similarity threshold and the time similarity threshold comprises:
calculating a similarity degree and a storage time difference between a pair of images in the plurality of images;
if the storage time difference is less than the predetermined time threshold, displaying the pair of images based on the similarity degree and the time similarity threshold; and
if the storage time difference is greater than or equal to the predetermined time threshold, displaying the pair of images based on the similarity degree and the updated similarity threshold.

9. A non-transitory computer-readable storage medium having stored therein instructions that, when executed by a processor of a terminal device, cause the terminal device to perform a method for displaying a plurality of images, the method comprising:
obtaining one or more image sets based on the plurality of images, wherein a similarity degree between each pair of images in each image set is greater than a similarity threshold;
identifying an operation instruction triggered on at least one of the image sets;
if the operation instruction triggered on the at least one of the image sets satisfies a predetermined updating condition, updating the similarity threshold; and
displaying the plurality of images based on the updated similarity threshold,
wherein updating the similarity threshold comprises:
detecting whether the operation instruction is configured for extracting an image from the at least one of the image sets or configured for adding an image to the at least one of the image sets;

if the operation instruction is configured for extracting an image from the at least one of the image sets, increasing the similarity threshold; and if the operation instruction is configured for adding an image to the at least one of the image sets, decreasing the similarity threshold, wherein detecting whether the operation instruction is configured for extracting an image from the at least one of the image sets or configured for adding an image to the at least one of the image sets comprises:

obtaining a difference value based on an opening instruction, an extracting instruction, and an adding instruction;

if the difference value is positive and greater than a first threshold, determining that the operation instruction is configured for extracting the image from the at least one of the image sets; and if the difference value is negative and less than a second threshold, determining that the operation instruction is configured for adding the image to the at least one of the image sets.

* * * * *